US009602968B2

(12) United States Patent
Hines et al.

(10) Patent No.: US 9,602,968 B2
(45) Date of Patent: Mar. 21, 2017

(54) AREA WATCHER FOR WIRELESS NETWORK

(71) Applicant: TELECOMMUNICATION SYSTEMS, INC., Annapolis, MD (US)

(72) Inventors: Gordon Hines, Kirkland, WA (US); Mario G. Tapia, Seattle, WA (US); Will Cousins, Seattle, WA (US)

(73) Assignee: Telecommunication Systems, Inc., Annapolis, MD (US)

( * ) Notice: Subject to any disclaimer, the term of this patent is extended or adjusted under 35 U.S.C. 154(b) by 0 days.

(21) Appl. No.: 14/470,409

(22) Filed: Aug. 27, 2014

(65) Prior Publication Data

US 2014/0364145 A1 Dec. 11, 2014

Related U.S. Application Data

(60) Continuation of application No. 11/360,579, filed on Feb. 24, 2006, now Pat. No. 9,154,906, which is a
(Continued)

(51) Int. Cl.
*H04W 24/00* (2009.01)
*H04W 4/02* (2009.01)
(Continued)

(52) U.S. Cl.
CPC ............. *H04W 4/021* (2013.01); *H04L 67/18* (2013.01); *H04W 4/02* (2013.01); *H04W 4/14* (2013.01);
(Continued)

(58) Field of Classification Search
CPC .......... H04W 4/02; H04W 8/08; H04W 64/00
(Continued)

(56) References Cited

U.S. PATENT DOCUMENTS 1,103,073 A 7/1914 O'Connell
4,445,118 A 4/1984 Taylor et al.
(Continued)

FOREIGN PATENT DOCUMENTS

WO  WO 99/21380  4/1999
WO  WO 00/40036  7/2000
(Continued)

OTHER PUBLICATIONS

European Search Report for corresponding EP 06 82 7172, completed Dec. 15, 2009 by Officer Jorg Bohmert.
(Continued)

*Primary Examiner* — Huy C Ho
(74) *Attorney, Agent, or Firm* — Tarolli, Sundheim, Covell & Tummino LLP

(57) ABSTRACT

Dynamic and current information is provided regarding a wireless device's entry into or exit from a geographically defined "watched" area. An area watcher application monitors preconfigured wireless devices entry/exit into preconfigured watched areas. The watched areas may watch for any/all subscribers, or for select, preconfigured subscribers listed in an appropriate table or database. Provision of location information is triggered by a wireless subscriber's entry, exit or changing between designated 'watched' areas or locations. Continuous polling may be used, or the mobile device itself or network element may be triggered to push its own location upon notification of its entry into or out of watched areas from an area watcher. A third party may be notified when a wireless user enters an area surrounding their retail store, and be sent a message such as "sale inside", or "Your rentals are overdue", on their wireless device.

20 Claims, 7 Drawing Sheets

Related U.S. Application Data division of application No. 10/318,171, filed on Dec. 13, 2002, now Pat. No. 7,321,773.

(60) Provisional application No. 60/367,710, filed on Mar. 28, 2002.

(51) Int. Cl.
*H04W 4/14* (2009.01)
*H04W 64/00* (2009.01)
*H04L 29/08* (2006.01)

(52) U.S. Cl.
CPC ......... *H04W 64/00* (2013.01); *H04W 64/006* (2013.01)

(58) Field of Classification Search
USPC ...................................................... 455/456.3
See application file for complete search history.

(56) References Cited

U.S. PATENT DOCUMENTS

| | | |
|---|---|---|
| 4,494,119 A | 1/1985 | Wimbush |
| 4,651,156 A | 3/1987 | Martinez |
| 4,706,275 A | 11/1987 | Kamil |
| 4,868,570 A | 9/1989 | Davis |
| 4,891,638 A | 1/1990 | Davis |
| 4,891,650 A | 1/1990 | Sheffer |
| 4,952,928 A | 8/1990 | Carroll et al. |
| 4,972,484 A | 11/1990 | Theile et al. |
| 5,014,206 A | 5/1991 | Scribner et al. |
| 5,043,736 A | 8/1991 | Darnell et al. |
| 5,055,851 A | 10/1991 | Sheffer |
| 5,068,656 A | 11/1991 | Sutherland |
| 5,068,891 A | 11/1991 | Marshall |
| 5,070,329 A | 12/1991 | Jasinaki |
| 5,081,667 A | 1/1992 | Drori et al. |
| 5,119,104 A | 6/1992 | Heller |
| 5,144,283 A | 9/1992 | Arens et al. |
| 5,161,180 A | 11/1992 | Chavous |
| 5,166,972 A | 11/1992 | Smith |
| 5,177,478 A | 1/1993 | Wagai et al. |
| 5,193,215 A | 3/1993 | Olmer |
| 5,208,756 A | 5/1993 | Song |
| 5,214,789 A | 5/1993 | George |
| 5,218,367 A | 6/1993 | Sheffer et al. |
| 5,223,844 A | 6/1993 | Mansell et al. |
| 5,239,570 A | 8/1993 | Koster et al. |
| 5,265,630 A | 11/1993 | Hartmann |
| 5,266,944 A | 11/1993 | Carroll et al. |
| 5,283,570 A | 2/1994 | DeLuca et al. |
| 5,289,527 A | 2/1994 | Tiedemann, Jr. |
| 5,293,642 A | 3/1994 | Lo |
| 5,299,132 A | 3/1994 | Wortham |
| 5,311,516 A | 5/1994 | Kuznicki et al. |
| 5,325,302 A | 6/1994 | Izidon et al. |
| 5,327,529 A | 7/1994 | Fults et al. |
| 5,334,974 A | 8/1994 | Simms et al. |
| 5,343,493 A | 8/1994 | Karimullah |
| 5,347,568 A | 9/1994 | Moody et al. |
| 5,351,235 A | 9/1994 | Lahtinen |
| 5,361,212 A | 11/1994 | Class et al. |
| 5,363,425 A | 11/1994 | Mufti et al. |
| 5,374,936 A | 12/1994 | Feng |
| 5,379,451 A | 1/1995 | Nakagoshi et al. |
| 5,381,338 A | 1/1995 | Wysocki et al. |
| 5,387,993 A | 2/1995 | Heller et al. |
| 5,388,147 A | 2/1995 | Grimes |
| 5,390,339 A | 2/1995 | Bruckert et al. |
| 5,394,158 A | 2/1995 | Chia |
| 5,396,227 A | 3/1995 | Carroll et al. |
| 5,398,190 A | 3/1995 | Wortham |
| 5,406,614 A | 4/1995 | Hara |
| 5,418,537 A | 5/1995 | Bird |
| 5,423,076 A | 6/1995 | Westergren et al. |
| 5,432,841 A | 7/1995 | Rimer |
| 5,434,789 A | 7/1995 | Fraker et al. |
| 5,454,024 A | 9/1995 | Lebowitz |
| 5,461,390 A | 10/1995 | Hoshen |
| 5,470,233 A | 11/1995 | Fruchterman et al. |
| 5,479,408 A | 12/1995 | Will |
| 5,479,482 A | 12/1995 | Grimes |
| 5,485,161 A | 1/1996 | Vaughn |
| 5,485,163 A | 1/1996 | Singer et al. |
| 5,488,563 A | 1/1996 | Chazelle et al. |
| 5,494,091 A | 2/1996 | Freeman et al. |
| 5,497,149 A | 3/1996 | Fast |
| 5,508,931 A | 4/1996 | Snider |
| 5,513,243 A | 4/1996 | Kage |
| 5,515,287 A | 5/1996 | Hakoyama et al. |
| 5,519,403 A | 5/1996 | Bickley et al. |
| 5,530,655 A | 6/1996 | Lokhoff et al. |
| 5,530,914 A | 6/1996 | McPheters |
| 5,532,690 A | 7/1996 | Hertel |
| 5,535,434 A | 7/1996 | Siddoway et al. |
| 5,539,398 A | 7/1996 | Hall et al. |
| 5,539,829 A | 7/1996 | Lokhoff et al. |
| 5,543,776 A | 8/1996 | L'Esperance et al. |
| 5,552,772 A | 9/1996 | Janky et al. |
| 5,555,286 A | 9/1996 | Tendler |
| 5,568,119 A | 10/1996 | Schipper et al. |
| 5,574,648 A | 11/1996 | Pilley |
| 5,579,372 A | 11/1996 | Astrom |
| 5,588,009 A | 12/1996 | Will |
| 5,592,535 A | 1/1997 | Klotz |
| 5,604,486 A | 2/1997 | Lauro et al. |
| 5,606,313 A | 2/1997 | Allen et al. |
| 5,606,618 A | 2/1997 | Lokhoff et al. |
| 5,606,850 A | 3/1997 | Nakamura |
| 5,610,815 A | 3/1997 | Gudat et al. |
| 5,614,890 A | 3/1997 | Fox |
| 5,615,116 A | 3/1997 | Gudat et al. |
| 5,621,793 A | 4/1997 | Bednarek et al. |
| 5,628,051 A | 5/1997 | Salin |
| 5,633,912 A | 5/1997 | Tsoi |
| 5,636,276 A | 6/1997 | Brugger |
| 5,661,755 A | 8/1997 | Van De Kerkhof et al. |
| 5,682,600 A | 10/1997 | Salin |
| 5,699,053 A | 12/1997 | Jonsson |
| 5,704,029 A | 12/1997 | Wright, Jr. |
| 5,721,781 A | 2/1998 | Deo et al. |
| 5,740,534 A | 4/1998 | Ayerst et al. |
| 5,761,618 A | 6/1998 | Lynch et al. |
| 5,765,152 A | 6/1998 | Erickson |
| 5,767,795 A | 6/1998 | Schaphorst |
| 5,768,509 A | 6/1998 | Gunluk |
| 5,771,353 A | 6/1998 | Eggleston et al. |
| 5,774,533 A | 6/1998 | Patel |
| 5,774,670 A | 6/1998 | Montulli |
| 5,778,304 A * | 7/1998 | Grube et al. ............... 455/456.4 |
| 5,787,357 A | 7/1998 | Salin |
| 5,794,142 A | 8/1998 | Vanttila et al. |
| 5,797,096 A | 8/1998 | Lupien et al. |
| 5,802,492 A | 9/1998 | DeLorme et al. |
| 5,806,000 A | 9/1998 | Vo et al. |
| 5,809,415 A | 9/1998 | Rossmann |
| 5,812,087 A | 9/1998 | Krasner |
| 5,822,700 A | 10/1998 | Hult et al. |
| 5,828,740 A | 10/1998 | Khuc et al. |
| 5,835,907 A | 11/1998 | Newman |
| 5,841,396 A | 11/1998 | Krasner |
| 5,857,201 A | 1/1999 | Wright, Jr. et al. |
| 5,864,667 A | 1/1999 | Barkan |
| 5,874,914 A | 2/1999 | Krasner |
| 5,896,369 A | 4/1999 | Warsta et al. |
| 5,920,821 A | 7/1999 | Seazholtz et al. |
| 5,922,074 A | 7/1999 | Richard et al. |
| 5,930,250 A | 7/1999 | Klok et al. |
| 5,930,701 A | 7/1999 | Skog |
| 5,943,399 A | 8/1999 | Bannister et al. |
| 5,945,944 A | 8/1999 | Krasner |
| 5,946,629 A | 8/1999 | Sawyer et al. |
| 5,946,630 A | 8/1999 | Willars et al. |
| 5,950,130 A | 9/1999 | Coursey |

(56) References Cited

U.S. PATENT DOCUMENTS

| | | |
|---|---|---|
| 5,953,398 A | 9/1999 | Hill |
| 5,960,362 A | 9/1999 | Grob et al. |
| 5,974,054 A | 10/1999 | Couts et al. |
| 5,976,685 A | 11/1999 | Kelly et al. |
| 5,983,099 A | 11/1999 | Yao et al. |
| 5,987,323 A | 11/1999 | Huotari |
| 5,999,124 A | 12/1999 | Sheynblat |
| 6,014,602 A | 1/2000 | Kithil et al. |
| 6,032,051 A | 2/2000 | Hall et al. |
| 6,035,025 A | 3/2000 | Hanson |
| 6,049,710 A | 4/2000 | Nilsson |
| 6,052,081 A | 4/2000 | Krasner |
| 6,058,300 A | 5/2000 | Hanson |
| 6,058,338 A | 5/2000 | Agashe et al. |
| 6,061,018 A | 5/2000 | Sheynblat |
| 6,061,346 A | 5/2000 | Nordman |
| 6,064,336 A | 5/2000 | Krasner |
| 6,064,875 A | 5/2000 | Morgan |
| 6,070,067 A | 5/2000 | Nguyen et al. |
| 6,075,982 A | 6/2000 | Donovan et al. |
| 6,081,508 A | 6/2000 | West et al. |
| 6,085,320 A | 7/2000 | Kaliski, Jr. |
| 6,101,378 A | 8/2000 | Barabash et al. |
| 6,104,931 A | 8/2000 | Havinis et al. |
| 6,108,533 A | 8/2000 | Brohoff |
| 6,122,503 A | 9/2000 | Daly |
| 6,122,520 A | 9/2000 | Want et al. |
| 6,124,810 A | 9/2000 | Segal et al. |
| 6,131,067 A | 10/2000 | Girerd et al. |
| 6,133,874 A | 10/2000 | Krasner et al. |
| 6,134,316 A | 10/2000 | Kallioniemi et al. |
| 6,134,483 A | 10/2000 | Vayanos et al. |
| 6,138,003 A | 10/2000 | Kingdon et al. |
| 6,148,197 A | 11/2000 | Bridges et al. |
| 6,148,198 A | 11/2000 | Anderson et al. |
| 6,149,353 A | 11/2000 | Nilsson |
| 6,169,891 B1 | 1/2001 | Gorham et al. |
| 6,173,181 B1 | 1/2001 | Losh |
| 6,178,505 B1 | 1/2001 | Schneider et al. |
| 6,178,506 B1 | 1/2001 | Quick, Jr. |
| 6,181,935 B1 | 1/2001 | Gossman et al. |
| 6,181,939 B1 | 1/2001 | Ahvenainen |
| 6,185,427 B1 | 2/2001 | Krasner et al. |
| 6,188,354 B1 | 2/2001 | Soliman et al. |
| 6,188,752 B1 | 2/2001 | Lesley |
| 6,188,909 B1 | 2/2001 | Alanara et al. |
| 6,189,098 B1 | 2/2001 | Kaliski, Jr. |
| 6,198,431 B1 | 3/2001 | Gibson |
| 6,199,045 B1 | 3/2001 | Giniger et al. |
| 6,199,113 B1 | 3/2001 | Alegre et al. |
| 6,205,330 B1 | 3/2001 | Winbladh |
| 6,208,854 B1 | 3/2001 | Roberts et al. |
| 6,215,441 B1 | 4/2001 | Moeglein et al. |
| 6,219,557 B1 | 4/2001 | Havinis |
| 6,223,046 B1 | 4/2001 | Hamill-Keays et al. |
| 6,226,529 B1 | 5/2001 | Bruno et al. |
| 6,239,742 B1 | 5/2001 | Krasner |
| 6,247,135 B1 | 6/2001 | Feague |
| 6,248,873 B1 | 6/2001 | Bilginturan et al. |
| 6,249,680 B1 | 6/2001 | Wax et al. |
| 6,249,873 B1 | 6/2001 | Richard et al. |
| 6,253,074 B1 | 6/2001 | Carlsson et al. |
| 6,260,147 B1 | 7/2001 | Quick, Jr. |
| 6,266,614 B1 | 7/2001 | Alumbaugh |
| 6,275,692 B1 | 8/2001 | Skog |
| 6,275,849 B1 | 8/2001 | Ludwig |
| 6,278,701 B1 | 8/2001 | Ayyagari et al. |
| 6,289,373 B1 | 9/2001 | Dezonno |
| 6,307,504 B1 | 10/2001 | Sheynblat |
| 6,308,269 B2 | 10/2001 | Proidl |
| 6,313,786 B1 | 11/2001 | Sheynblat et al. |
| 6,317,594 B1 | 11/2001 | Gossman et al. |
| 6,321,091 B1 | 11/2001 | Holland |
| 6,321,092 B1 | 11/2001 | Fitch et al. |
| 6,321,257 B1 | 11/2001 | Kotola et al. |
| 6,324,542 B1 | 11/2001 | Wright, Jr. et al. |
| 6,327,473 B1 | 12/2001 | Soliman et al. |
| 6,327,479 B1 | 12/2001 | Mikkola |
| 6,330,454 B1 | 12/2001 | Verdonk |
| 6,333,919 B2 | 12/2001 | Gaffney |
| 6,360,093 B1 | 3/2002 | Ross et al. |
| 6,367,019 B1 | 4/2002 | Ansell et al. |
| 6,370,389 B1 | 4/2002 | Isomursu et al. |
| 6,377,209 B1 | 4/2002 | Krasner |
| 6,377,810 B1 | 4/2002 | Geiger et al. |
| 6,397,208 B1 | 5/2002 | Lee |
| 6,400,314 B1 | 6/2002 | Krasner |
| 6,400,958 B1 | 6/2002 | Isomursu et al. |
| 6,411,254 B1 | 6/2002 | Moeglein et al. |
| 6,421,002 B2 | 7/2002 | Krasner |
| 6,427,001 B1 | 7/2002 | Contractor et al. |
| 6,433,734 B1 | 8/2002 | Krasner |
| 6,434,381 B1 | 8/2002 | Moore et al. |
| 6,449,473 B1 | 9/2002 | Raivisto |
| 6,449,476 B1 | 9/2002 | Hutchison, IV et al. |
| 6,456,852 B2 | 9/2002 | Bar et al. |
| 6,477,150 B1 | 11/2002 | Maggenti et al. |
| 6,504,491 B1 | 1/2003 | Christians |
| 6,505,049 B1 | 1/2003 | Dorenbosch |
| 6,510,387 B2 | 1/2003 | Fuchs et al. |
| 6,512,922 B1 | 1/2003 | Burg et al. |
| 6,512,930 B2 | 1/2003 | Sandegren |
| 6,515,623 B2 | 2/2003 | Johnson |
| 6,519,466 B2 | 2/2003 | Pande et al. |
| 6,522,682 B1 | 2/2003 | Kohli et al. |
| 6,526,026 B1 | 2/2003 | Menon |
| 6,529,500 B1 | 3/2003 | Pandharipande |
| 6,529,829 B2 | 3/2003 | Turetzky et al. |
| 6,531,982 B1 | 3/2003 | White et al. |
| 6,538,757 B1 | 3/2003 | Sansone |
| 6,539,200 B1 | 3/2003 | Schiff |
| 6,539,232 B2 | 3/2003 | Hendrey et al. |
| 6,539,304 B1 | 3/2003 | Chansarkar |
| 6,542,464 B1 | 4/2003 | Takeda et al. |
| 6,542,743 B1 | 4/2003 | Soliman |
| 6,549,776 B1 | 4/2003 | Joong |
| 6,549,844 B1 | 4/2003 | Egberts |
| 6,553,236 B1 | 4/2003 | Dunko et al. |
| 6,556,832 B1 | 4/2003 | Soliman |
| 6,560,534 B2 | 5/2003 | Abraham et al. |
| 6,564,261 B1 | 5/2003 | Gudjonsson et al. |
| 6,570,530 B2 | 5/2003 | Gaal et al. |
| 6,571,095 B1 | 5/2003 | Koodli |
| 6,574,558 B2 | 6/2003 | Kohli |
| 6,584,552 B1 | 6/2003 | Nishimura et al. |
| 6,587,691 B1 | 7/2003 | Granstam et al. |
| 6,594,500 B2 | 7/2003 | Bender et al. |
| 6,597,311 B2 | 7/2003 | Sheynblat et al. |
| 6,600,927 B2 | 7/2003 | Hamilton et al. |
| 6,606,554 B2 | 8/2003 | Edge |
| 6,609,495 B1 | 8/2003 | Cornell et al. |
| 6,611,757 B2 | 8/2003 | Brodie |
| 6,618,593 B1 | 9/2003 | Drutman et al. |
| 6,618,670 B1 | 9/2003 | Chansarkar |
| 6,621,452 B2 | 9/2003 | Knockeart et al. |
| 6,621,810 B1 | 9/2003 | Leung |
| 6,628,233 B2 | 9/2003 | Knockeart et al. |
| 6,633,255 B2 | 10/2003 | Krasner |
| 6,640,184 B1 | 10/2003 | Rabe |
| 6,661,372 B1 | 12/2003 | Girerd et al. |
| 6,665,539 B2 | 12/2003 | Sih et al. |
| 6,665,541 B1 | 12/2003 | Krasner et al. |
| 6,671,620 B1 | 12/2003 | Garin et al. |
| 6,677,894 B2 | 1/2004 | Sheynblat et al. |
| 6,680,694 B1 | 1/2004 | Knockeart et al. |
| 6,680,695 B2 | 1/2004 | Turetzky et al. |
| 6,687,504 B1 | 2/2004 | Raith |
| 6,691,019 B2 | 2/2004 | Seeley et al. |
| 6,694,258 B2 | 2/2004 | Johnson et al. |
| 6,694,351 B1 | 2/2004 | Shaffer et al. |
| 6,697,629 B1 | 2/2004 | Grilli et al. |
| 6,698,195 B1 | 3/2004 | Hellinger |
| 6,701,144 B2 | 3/2004 | Kirbas et al. |
| 6,703,971 B2 | 3/2004 | Pande et al. |

(56) References Cited

U.S. PATENT DOCUMENTS

| | | |
|---|---|---|
| 6,703,972 B2 | 3/2004 | van Diggelen |
| 6,704,651 B2 | 3/2004 | van Diggelen |
| 6,707,421 B1 | 3/2004 | Drury et al. |
| 6,711,408 B1 * | 3/2004 | Raith ............... H04W 36/32 340/988 |
| 6,714,793 B1 | 3/2004 | Carey et al. |
| 6,718,174 B2 | 4/2004 | Vayanos |
| 6,720,915 B2 | 4/2004 | Sheynblat |
| 6,721,578 B2 | 4/2004 | Minear et al. |
| 6,721,871 B2 | 4/2004 | Piispanen et al. |
| 6,725,159 B2 | 4/2004 | Krasner |
| 6,728,701 B1 | 4/2004 | Stoica |
| 6,731,940 B1 | 5/2004 | Nagendran |
| 6,734,821 B2 | 5/2004 | van Diggelen |
| 6,738,013 B2 | 5/2004 | Orler et al. |
| 6,738,800 B1 | 5/2004 | Aquilon et al. |
| 6,741,842 B2 | 5/2004 | Goldberg et al. |
| 6,744,856 B2 | 6/2004 | Karnik et al. |
| 6,744,858 B1 | 6/2004 | Ryan et al. |
| 6,745,038 B2 | 6/2004 | Callaway, Jr. et al. |
| 6,747,596 B2 | 6/2004 | Orler et al. |
| 6,748,195 B1 | 6/2004 | Phillips |
| 6,751,464 B1 | 6/2004 | Burg et al. |
| 6,756,938 B2 | 6/2004 | Zhao et al. |
| 6,757,544 B2 | 6/2004 | Rangarajan et al. |
| 6,771,742 B2 | 8/2004 | McCalmont et al. |
| 6,771,971 B2 | 8/2004 | Smith |
| 6,772,340 B1 | 8/2004 | Peinado et al. |
| 6,775,255 B1 | 8/2004 | Roy |
| 6,775,267 B1 | 8/2004 | Kung et al. |
| 6,775,534 B2 | 8/2004 | Lindgren et al. |
| 6,775,655 B1 | 8/2004 | Peinado et al. |
| 6,775,802 B2 | 8/2004 | Gaal |
| 6,778,136 B2 | 8/2004 | Gronemeyer |
| 6,778,885 B2 | 8/2004 | Agashe et al. |
| 6,781,963 B2 | 8/2004 | Crockett et al. |
| 6,788,249 B1 | 9/2004 | Farmer et al. |
| 6,795,444 B1 | 9/2004 | Vo et al. |
| 6,795,699 B1 | 9/2004 | McCraw et al. |
| 6,799,049 B1 | 9/2004 | Zellner et al. |
| 6,799,050 B1 | 9/2004 | Krasner |
| 6,801,159 B2 | 10/2004 | Swope et al. |
| 6,807,534 B1 | 10/2004 | Erickson |
| 6,810,323 B1 | 10/2004 | Bullock et al. |
| 6,813,264 B2 | 11/2004 | Vassilovski |
| 6,813,560 B2 | 11/2004 | van Diggelen et al. |
| 6,816,111 B2 | 11/2004 | Krasner |
| 6,816,710 B2 | 11/2004 | Krasner |
| 6,816,719 B1 | 11/2004 | Heinonen et al. |
| 6,816,734 B2 | 11/2004 | Wong et al. |
| 6,820,269 B2 | 11/2004 | Baucke et al. |
| 6,829,475 B1 | 12/2004 | Lee et al. |
| 6,832,373 B2 | 12/2004 | O'Neill |
| 6,839,020 B2 | 1/2005 | Geier et al. |
| 6,839,021 B2 | 1/2005 | Sheynblat et al. |
| 6,839,417 B2 | 1/2005 | Weisman et al. |
| 6,842,715 B1 | 1/2005 | Gaal |
| 6,847,618 B2 | 1/2005 | Laursen et al. |
| 6,847,822 B1 | 1/2005 | Dennison et al. |
| 6,853,916 B2 | 2/2005 | Fuchs et al. |
| 6,861,980 B1 | 3/2005 | Rowitch et al. |
| 6,865,171 B1 | 3/2005 | Nilsson |
| 6,865,395 B2 | 3/2005 | Riley |
| 6,867,733 B2 | 3/2005 | Sandhu et al. |
| 6,867,734 B2 | 3/2005 | Voor et al. |
| 6,873,854 B2 | 3/2005 | Crockett et al. |
| 6,876,734 B1 | 4/2005 | Summers et al. |
| 6,882,850 B2 | 4/2005 | McConnell et al. |
| 6,885,874 B2 | 4/2005 | Grube et al. |
| 6,885,940 B2 | 4/2005 | Brodie et al. |
| 6,888,497 B2 | 5/2005 | King et al. |
| 6,888,932 B2 | 5/2005 | Snip et al. |
| 6,895,238 B2 | 5/2005 | Newell et al. |
| 6,895,249 B2 | 5/2005 | Gaal |
| 6,898,633 B1 | 5/2005 | Lyndersay et al. |
| 6,900,758 B1 | 5/2005 | Mann et al. |
| 6,903,684 B1 | 6/2005 | Simic et al. |
| 6,904,029 B2 | 6/2005 | Fors et al. |
| 6,907,224 B2 | 6/2005 | Younis |
| 6,907,238 B2 | 6/2005 | Leung |
| 6,912,230 B1 | 6/2005 | Salkini et al. |
| 6,912,395 B2 | 6/2005 | Benes et al. |
| 6,912,545 B1 | 6/2005 | Lundy et al. |
| 6,915,208 B2 | 7/2005 | Garin et al. |
| 6,917,331 B2 | 7/2005 | Gronemeyer |
| 6,930,634 B2 | 8/2005 | Peng et al. |
| 6,937,187 B2 | 8/2005 | van Diggelen et al. |
| 6,937,872 B2 | 8/2005 | Krasner |
| 6,940,826 B1 | 9/2005 | Simard et al. |
| 6,940,950 B2 | 9/2005 | Dickinson et al. |
| 6,941,144 B2 | 9/2005 | Stein |
| 6,944,540 B2 | 9/2005 | King et al. |
| 6,947,772 B2 | 9/2005 | Minear et al. |
| 6,950,058 B1 | 9/2005 | Davis et al. |
| 6,957,068 B2 | 10/2005 | Hutchison et al. |
| 6,961,562 B2 | 11/2005 | Ross |
| 6,963,557 B2 | 11/2005 | Knox |
| 6,965,754 B2 | 11/2005 | King |
| 6,965,767 B2 | 11/2005 | Maggenti et al. |
| 6,968,044 B2 | 11/2005 | Beason et al. |
| 6,970,917 B1 | 11/2005 | Kushwaha et al. |
| 6,973,320 B2 | 12/2005 | Brown et al. |
| 6,975,266 B2 | 12/2005 | Abraham et al. |
| 6,978,453 B2 | 12/2005 | Rao et al. |
| 6,980,816 B2 | 12/2005 | Rohles et al. |
| 6,985,747 B2 | 1/2006 | Chithambaram |
| 6,993,355 B1 | 1/2006 | Pershan |
| 6,996,720 B1 | 2/2006 | DeMello et al. |
| 6,999,782 B2 | 2/2006 | Shaughnessy et al. |
| 7,016,717 B2 | 3/2006 | Demos et al. |
| 7,024,321 B1 | 4/2006 | Deninger et al. |
| 7,024,393 B1 | 4/2006 | Peinado et al. |
| 7,027,667 B1 | 4/2006 | Sakaida |
| 7,047,411 B1 | 5/2006 | DeMello et al. |
| 7,065,507 B2 | 6/2006 | Mohammed et al. |
| 7,072,667 B2 | 7/2006 | Olrik et al. |
| 7,079,857 B2 | 7/2006 | Maggenti et al. |
| 7,103,018 B1 | 9/2006 | Hansen et al. |
| 7,103,574 B1 | 9/2006 | Peinado et al. |
| 7,106,717 B2 | 9/2006 | Rousseau et al. |
| 7,136,466 B1 | 11/2006 | Gao |
| 7,136,838 B1 | 11/2006 | Peinado et al. |
| 7,145,900 B2 | 12/2006 | Nix et al. |
| 7,151,946 B2 | 12/2006 | Maggenti et al. |
| 7,177,397 B2 | 2/2007 | McCalmont et al. |
| 7,177,398 B2 | 2/2007 | Meer et al. |
| 7,177,399 B2 | 2/2007 | Dawson et al. |
| 7,200,380 B2 | 4/2007 | Havlark et al. |
| 7,209,758 B1 | 4/2007 | Moll et al. |
| 7,209,969 B2 | 4/2007 | Lahti et al. |
| 7,218,940 B2 | 5/2007 | Niemenmaa et al. |
| 7,245,900 B1 | 7/2007 | Lamb et al. |
| 7,246,187 B1 | 7/2007 | Ezra et al. |
| 7,260,186 B2 | 8/2007 | Zhu et al. |
| 7,260,384 B2 | 8/2007 | Bales et al. |
| 7,269,428 B1 | 9/2007 | Wallenius et al. |
| 7,302,582 B2 | 11/2007 | Snapp et al. |
| 7,321,773 B2 | 1/2008 | Hines et al. |
| 7,330,899 B2 | 2/2008 | Wong |
| 7,333,480 B1 | 2/2008 | Clarke et al. |
| 7,369,508 B2 | 5/2008 | Parantainen et al. |
| 7,369,530 B2 | 5/2008 | Keagy |
| 7,382,773 B2 | 6/2008 | Schoeneberger et al. |
| 7,392,240 B2 | 6/2008 | Scriffignano et al. |
| 7,394,896 B2 | 7/2008 | Norton |
| 7,403,939 B1 | 7/2008 | Virdy |
| 7,412,049 B1 | 8/2008 | Koch |
| 7,424,293 B2 | 9/2008 | Zhu |
| 7,426,380 B2 | 9/2008 | Hines et al. |
| 7,428,571 B2 | 9/2008 | Ichimura |
| 7,436,785 B1 | 10/2008 | McMullen et al. |
| 7,440,442 B2 | 10/2008 | Grabelsky et al. |
| 7,453,990 B2 | 11/2008 | Welenson et al. |
| 7,495,608 B1 | 2/2009 | Chen et al. |

(56) References Cited

U.S. PATENT DOCUMENTS

| | | |
|---|---|---|
| 7,573,982 B2 | 8/2009 | Breen et al. |
| 7,623,447 B1 | 11/2009 | Faccin et al. |
| 7,711,094 B1 | 5/2010 | Olshansky et al. |
| 7,747,258 B2 | 6/2010 | Farmer |
| 7,764,961 B2 | 7/2010 | Zhu et al. |
| 7,783,297 B2 | 8/2010 | Ishii |
| 7,787,611 B1 | 8/2010 | Kotelly et al. |
| 7,790,989 B2 | 9/2010 | Delakowitz |
| 7,792,989 B2 | 9/2010 | Toebes et al. |
| 7,802,886 B2 | 9/2010 | Kawai |
| 7,890,122 B2 | 2/2011 | Walsh |
| 8,005,683 B2 | 8/2011 | Tessel et al. |
| 8,027,658 B2 | 9/2011 | Suryanarayana et al. |
| RE42,927 E | 11/2011 | Want et al. |
| 8,060,389 B2 | 11/2011 | Johnson |
| 8,308,570 B2 | 11/2012 | Fiedler |
| 2001/0021646 A1 | 9/2001 | Antonucci et al. |
| 2001/0040886 A1 | 11/2001 | Jimenez et al. |
| 2002/0037735 A1 | 3/2002 | Maggenti et al. |
| 2002/0040272 A1 | 4/2002 | Nagasaka et al. |
| 2002/0052214 A1 | 5/2002 | Maggenti et al. |
| 2002/0061760 A1 | 5/2002 | Maggenti et al. |
| 2002/0069529 A1 | 6/2002 | Wieres |
| 2002/0077083 A1 | 6/2002 | Zellner et al. |
| 2002/0077084 A1 | 6/2002 | Zellner et al. |
| 2002/0077118 A1* | 6/2002 | Zellner et al. ............... 455/456 |
| 2002/0077897 A1 | 6/2002 | Zellner et al. |
| 2002/0085538 A1 | 7/2002 | Leung |
| 2002/0086676 A1 | 7/2002 | Hendrey et al. |
| 2002/0098832 A1 | 7/2002 | Fleischer et al. |
| 2002/0102996 A1 | 8/2002 | Jenkins |
| 2002/0102999 A1 | 8/2002 | Maggenti et al. |
| 2002/0111172 A1 | 8/2002 | DeWolf et al. |
| 2002/0112047 A1 | 8/2002 | Kushwaha et al. |
| 2002/0118650 A1 | 8/2002 | Jagadeesan et al. |
| 2002/0119521 A1 | 8/2002 | Palli et al. |
| 2002/0123327 A1 | 9/2002 | Vataja |
| 2002/0126656 A1 | 9/2002 | Park |
| 2002/0138650 A1 | 9/2002 | Yamamoto et al. |
| 2002/0158777 A1 | 10/2002 | Flick |
| 2002/0161633 A1* | 10/2002 | Jacob et al. ................ 705/14 |
| 2002/0173317 A1 | 11/2002 | Nykanen et al. |
| 2002/0191595 A1 | 12/2002 | Mar et al. |
| 2003/0007886 A1 | 1/2003 | Hwa et al. |
| 2003/0009277 A1 | 1/2003 | Fan et al. |
| 2003/0009602 A1 | 1/2003 | Jacobs et al. |
| 2003/0013449 A1 | 1/2003 | Hose et al. |
| 2003/0016804 A1 | 1/2003 | Sheha et al. |
| 2003/0026245 A1 | 2/2003 | Ejzak |
| 2003/0037163 A1 | 2/2003 | Kitada et al. |
| 2003/0044654 A1 | 3/2003 | Holt |
| 2003/0065788 A1 | 4/2003 | Salomaki |
| 2003/0072318 A1 | 4/2003 | Lam et al. |
| 2003/0078064 A1 | 4/2003 | Chan |
| 2003/0081557 A1 | 5/2003 | Mettala et al. |
| 2003/0086539 A1 | 5/2003 | McCalmont et al. |
| 2003/0101329 A1 | 5/2003 | Lahti et al. |
| 2003/0103484 A1 | 6/2003 | Oommen et al. |
| 2003/0108176 A1 | 6/2003 | Kung et al. |
| 2003/0109245 A1 | 6/2003 | McCalmont et al. |
| 2003/0119521 A1 | 6/2003 | Tipnis et al. |
| 2003/0119528 A1 | 6/2003 | Pew et al. |
| 2003/0125042 A1* | 7/2003 | Olrik ................ H04W 4/02 455/456.1 |
| 2003/0137961 A1 | 7/2003 | Tsirtsis et al. |
| 2003/0153340 A1 | 8/2003 | Crockett et al. |
| 2003/0153341 A1 | 8/2003 | Crockett et al. |
| 2003/0153342 A1 | 8/2003 | Crockett et al. |
| 2003/0153343 A1 | 8/2003 | Crockett et al. |
| 2003/0161298 A1 | 8/2003 | Bergman et al. |
| 2003/0181160 A1 | 9/2003 | Hirsch |
| 2003/0186709 A1 | 10/2003 | Rhodes et al. |
| 2003/0196105 A1 | 10/2003 | Fineberg |
| 2003/0204640 A1 | 10/2003 | Sahinoja et al. |
| 2003/0223381 A1 | 12/2003 | Schroderus |
| 2004/0002326 A1 | 1/2004 | Maher |
| 2004/0018689 A1 | 1/2004 | Kim |
| 2004/0032485 A1 | 2/2004 | Stephen, Jr. |
| 2004/0043775 A1 | 3/2004 | Kennedy et al. |
| 2004/0044623 A1 | 3/2004 | Wake et al. |
| 2004/0047461 A1 | 3/2004 | Weisman et al. |
| 2004/0068724 A1 | 4/2004 | Gardner, III et al. |
| 2004/0076277 A1 | 4/2004 | Kuusinen et al. |
| 2004/0098497 A1 | 5/2004 | Banet et al. |
| 2004/0132465 A1 | 7/2004 | Mattila et al. |
| 2004/0143852 A1 | 7/2004 | Meyers |
| 2004/0184584 A1 | 9/2004 | McCalmont et al. |
| 2004/0185875 A1 | 9/2004 | Diacakis et al. |
| 2004/0190497 A1 | 9/2004 | Knox |
| 2004/0192271 A1 | 9/2004 | Eisner et al. |
| 2004/0198332 A1 | 10/2004 | Lundsgaard |
| 2004/0198386 A1 | 10/2004 | Dupray |
| 2004/0198396 A1 | 10/2004 | Fransioli |
| 2004/0205151 A1 | 10/2004 | Sprigg et al. |
| 2004/0229632 A1 | 11/2004 | Flynn et al. |
| 2004/0242238 A1 | 12/2004 | Wang et al. |
| 2004/0267445 A1 | 12/2004 | De Luca et al. |
| 2005/0020242 A1 | 1/2005 | Holland et al. |
| 2005/0028034 A1 | 2/2005 | Gantman et al. |
| 2005/0039178 A1 | 2/2005 | Marolia et al. |
| 2005/0041578 A1 | 2/2005 | Huotari et al. |
| 2005/0043037 A1 | 2/2005 | Ioppe et al. |
| 2005/0053209 A1 | 3/2005 | D'Evelyn et al. |
| 2005/0063519 A1 | 3/2005 | James |
| 2005/0074107 A1 | 4/2005 | Renner et al. |
| 2005/0078612 A1 | 4/2005 | Lang |
| 2005/0083891 A1 | 4/2005 | Chuang |
| 2005/0083911 A1 | 4/2005 | Grabelsky et al. |
| 2005/0086467 A1 | 4/2005 | Asokan et al. |
| 2005/0090236 A1 | 4/2005 | Schwinke et al. |
| 2005/0101335 A1 | 5/2005 | Kelly et al. |
| 2005/0107673 A1 | 5/2005 | Ball |
| 2005/0112030 A1 | 5/2005 | Gaus |
| 2005/0119012 A1 | 6/2005 | Merheb et al. |
| 2005/0125376 A1 | 6/2005 | Curtis et al. |
| 2005/0134504 A1 | 6/2005 | Harwood et al. |
| 2005/0135569 A1 | 6/2005 | Dickinson et al. |
| 2005/0136885 A1 | 6/2005 | Kaltsukis |
| 2005/0169248 A1 | 8/2005 | Truesdale et al. |
| 2005/0174991 A1 | 8/2005 | Keagy |
| 2005/0192822 A1 | 9/2005 | Hartenstein et al. |
| 2005/0201529 A1 | 9/2005 | Nelson et al. |
| 2005/0209995 A1 | 9/2005 | Aksu et al. |
| 2005/0213716 A1 | 9/2005 | Zhu et al. |
| 2005/0232252 A1 | 10/2005 | Hoover |
| 2005/0238156 A1 | 10/2005 | Turner |
| 2005/0255857 A1 | 11/2005 | Kim et al. |
| 2005/0259675 A1 | 11/2005 | Tuohino et al. |
| 2005/0265318 A1 | 12/2005 | Khartabil et al. |
| 2005/0271029 A1 | 12/2005 | Iffland |
| 2005/0282518 A1 | 12/2005 | D'Evelyn et al. |
| 2005/0287979 A1 | 12/2005 | Rollender |
| 2005/0289097 A1 | 12/2005 | Trossen et al. |
| 2006/0008065 A1 | 1/2006 | Longman et al. |
| 2006/0010200 A1 | 1/2006 | Mousseau et al. |
| 2006/0023747 A1 | 2/2006 | Koren et al. |
| 2006/0026288 A1 | 2/2006 | Acharya et al. |
| 2006/0038753 A1 | 2/2006 | Lee et al. |
| 2006/0053225 A1 | 3/2006 | Poikselka et al. |
| 2006/0068753 A1 | 3/2006 | Karpen et al. |
| 2006/0077911 A1 | 4/2006 | Shaffer et al. |
| 2006/0078094 A1 | 4/2006 | Breen et al. |
| 2006/0079330 A1 | 4/2006 | Dvorak et al. |
| 2006/0088152 A1 | 4/2006 | Green et al. |
| 2006/0120517 A1 | 6/2006 | Moon et al. |
| 2006/0128395 A1 | 6/2006 | Muhonen |
| 2006/0135177 A1 | 6/2006 | Winterbottom et al. |
| 2006/0154710 A1 | 7/2006 | Serafat |
| 2006/0188083 A1 | 8/2006 | Breen et al. |
| 2006/0193447 A1 | 8/2006 | Schwartz |
| 2006/0212558 A1 | 9/2006 | Sahinoja et al. |
| 2006/0234639 A1 | 10/2006 | Kushwaha et al. |
| 2006/0239205 A1 | 10/2006 | Warrant et al. |
| 2006/0250987 A1 | 11/2006 | White et al. |

(56) References Cited

U.S. PATENT DOCUMENTS

| | | |
|---|---|---|
| 2006/0281437 A1 | 12/2006 | Cook |
| 2006/0293024 A1 | 12/2006 | Benco et al. |
| 2006/0293066 A1 | 12/2006 | Edge et al. |
| 2007/0003024 A1 | 1/2007 | Olivier et al. |
| 2007/0019614 A1 | 1/2007 | Hoffmann |
| 2007/0021601 A1 | 1/2007 | Doucette-Stamm et al. |
| 2007/0022011 A1 | 1/2007 | Altberg et al. |
| 2007/0026854 A1 | 2/2007 | Nath et al. |
| 2007/0026871 A1 | 2/2007 | Wager |
| 2007/0027997 A1 | 2/2007 | Polk |
| 2007/0030539 A1 | 2/2007 | Nath et al. |
| 2007/0036139 A1 | 2/2007 | Patel et al. |
| 2007/0041513 A1 | 2/2007 | Gende |
| 2007/0049288 A1 | 3/2007 | Lamprecht et al. |
| 2007/0060097 A1 | 3/2007 | Edge et al. |
| 2007/0081635 A1 | 4/2007 | Croak et al. |
| 2007/0115941 A1 | 5/2007 | Patel et al. |
| 2007/0149213 A1 | 6/2007 | Lamba et al. |
| 2007/0160036 A1 | 7/2007 | Smith |
| 2007/0162228 A1 | 7/2007 | Mitchell |
| 2007/0201623 A1 | 8/2007 | Hines et al. |
| 2007/0202851 A1 | 8/2007 | Hines et al. |
| 2007/0206568 A1 | 9/2007 | Silver et al. |
| 2007/0206613 A1 | 9/2007 | Silver et al. |
| 2007/0242660 A1 | 10/2007 | Xu |
| 2007/0263610 A1 | 11/2007 | Mitchell |
| 2007/0270164 A1 | 11/2007 | Maier et al. |
| 2008/0037715 A1 | 2/2008 | Prozeniuk et al. |
| 2008/0059304 A1 | 3/2008 | Kimsey |
| 2008/0063153 A1 | 3/2008 | Krivorot et al. |
| 2008/0065775 A1 | 3/2008 | Polk |
| 2008/0117859 A1 | 5/2008 | Shahidi et al. |
| 2008/0146343 A1 | 6/2008 | Sullivan et al. |
| 2008/0186164 A1 | 8/2008 | Emigh et al. |
| 2008/0214202 A1 | 9/2008 | Toomey |
| 2008/0249967 A1 | 10/2008 | Flinn et al. |
| 2009/0323636 A1 | 12/2009 | Dillon et al. |
| 2010/0218664 A1 | 9/2010 | Toledano et al. |
| 2011/0171977 A1* | 7/2011 | Putkiranta ............... 455/456.3 |
| 2011/0273568 A1 | 11/2011 | Lagassey |
| 2012/0001750 A1 | 1/2012 | Monroe |
| 2012/0189107 A1 | 7/2012 | Dickinson et al. |
| 2013/0072308 A1 | 3/2013 | Peck et al. |
| 2013/0079152 A1 | 3/2013 | Hall |

FOREIGN PATENT DOCUMENTS

| | | |
|---|---|---|
| WO | WO 01/45342 | 6/2001 |
| WO | WO 02/057869 | 7/2002 |
| WO | WO 2004/025941 A2 | 3/2004 |
| WO | WO 2005/051033 A1 | 6/2005 |
| WO | WO 2007/027166 A3 | 3/2007 |

OTHER PUBLICATIONS

PCT International Search Report for corresponding PCT/US2011/001990, completed Apr. 11, 2012 by Officer Blaine R. Copenheaver.

PCT International Search Report for corresponding PCT/US2011/001971, completed Feb. 6, 2013 by Officer Lee W. Young.

International Search Report in PCT/US2007/23243 dated Apr. 2, 2008.

Qualcom CDMA Technologies, LBS Control Plane/User Plane Overview—80-VD378-1NP B, 206, pp. 1-36.

Mike McMullen, Sprint, LBS Roaming Summit, Sep. 19, 2006.

Bhalla et al., TELUS, Technology Strategy—LBS Roaming Summit, Sep. 19, 2006.

Alfredo Aguirre, IUSACELL, First and Only Carrier in Mexico with a 3G CDMA Network, 2007.

Andrew Yeow, BCE, LBS Roaming Summit, Sep. 19, 2006, pp. 1-8.

Nars Haran, U.S. Cellular Packet Data—Roaming and LVS Overview, Nov. 2, 2007, pp. 1-15.

Intrado MSAG Prep for E911 Program and Documentation. Intrado Inc., Longmont, CO. Sep. 14, 2006, Accessed: Nov. 8, 2011. Idaho PSAP Standards Communications Commission, http://idahodispatch.com/index.php?option=com_documan&task=doc_downloaded&gid=3&itemid=7.

Qualcom CDMA Technologies, LBS Control Plane Roaming—80-VD377-1NP A, 2006, pp. 1-10.

Intrado Inc., Qwest Detailed SR/ALI to MPC/GMLC Interface Specification for TCP/IP Implementation of TIA/EIA.J-STD-036 E2 with Phase I Location Description Addition, Intrado Informed Response; Apr. 2004; Issue 1.11; pp. 1-57.

Yilin Zhao, Efficient and Reliable Data Transmission for Cellular and GPS based Mayday Systems. Nov. 1997, IEEE, IEEE Conference on Intelligent Transportation System, 1997, ITSC 97, 555-559.

Location Based Services V2 Roaming Support (non-proprietary), 80-V8470-2NP A, dated Jan. 27, 2005, pp. 1-56.

Le-Pond Chin, Jyh-Hong Wen, Ting-Way Liu, The Study of the Interconnection of GSM Mobile Communication System Over IP based Network, May 6, 2001, IEEE, Vehicular Technology Conference, vol. 3, pp. 2219-2223.

* cited by examiner

When a watched UE enters a defined area,
the location server or UE trigger a message to report the UE location to the Location.

When a watched UE leaves a defined area,
the location server or UE trigger a message to report the UE location to the Location.

AREA WATCHER FOR WIRELESS NETWORK

RELATED APPLICATION

This application is a continuation of U.S. patent application Ser. No. 11/360,579, filed 24 Feb. 2006; which is a divisional application of Ser. No. 10/318,171, filed Dec. 13, 2002; which claims the benefit of provisional application Ser. No. 60/367,710, filed Mar. 28, 2002, all of which are incorporated herein in their entirety.

BACKGROUND OF THE INVENTION

Field of the Invention

This invention relates generally to wireless and long distance carriers, Internet service providers (ISPs), and information content delivery services/providers and long distance carriers. More particularly, it relates to location services for the wireless industry.

Background of Related Art

The Location Interoperability Forum (LIF), the Wireless Application Protocol (WAP) Forum, and 3.sup.rd Generation Partnership Project (3GPP) have attempted to define an area trigger via Application Protocol Interfaces (APIs) specific to these groups.

The problem with the above solutions is that they are not well defined or do not implement schemes that would permit functionality to support area watching features such as are provided by the present invention.

SUMMARY OF THE INVENTION

In accordance with the principles of the present invention, a subscriber feature for a wireless system comprises a database associating a particular wireless device with at least one geographic area. An area watcher outputs a trigger message upon the particular wireless device's entry into or exit from the at least one geographic area.

A method of providing a message to a wireless device upon their entry or exit from a pre-defined geographic area in accordance with another aspect of the present invention comprises establishing a watched geographic area. Location information regarding wireless devices is monitored, and an area watch message is triggered upon detection of a particular wireless device's entry into the watched geographic area.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
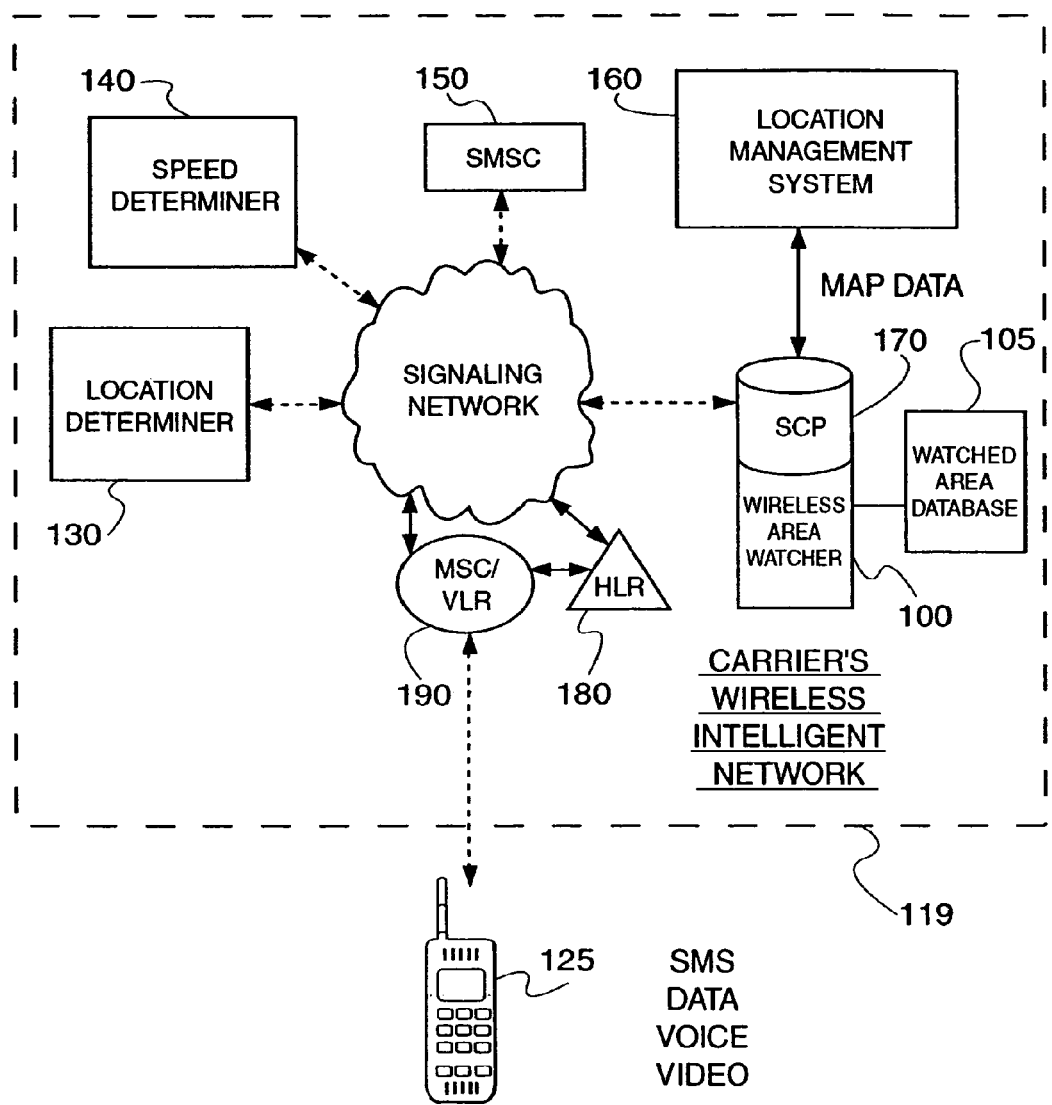
FIG. 1 shows a wireless network tour guide application resident in an SCP of a carrier's wireless intelligent network, in accordance with the principles of the present invention.

The present invention provides an architecture and method in a wireless messaging and/or telephonic system for providing information regarding when a wireless network device (e.g., a wireless phone) enters and/or leaves a geographically defined area that is being "watched" by an area watcher application. The area watcher application commissions and intertwines location based wireless services in a service provider's network with a message system to automatically provide to a requesting third party information regarding a subscriber's dynamic proximity to a watched area.

An area watcher is a monitoring service that delivers mobile device location information triggered by a wireless subscriber's entry, exit or changing between designated 'watched' areas or locations.

Exemplary techniques of watching a designated area or location include, e.g., 1) continuous polling of the mobile device under the direction of an area watcher application program; 2) a software feature in the mobile device itself pushes its location to an area watcher application program; or 3) devices in the radio network determine a location of the mobile device subject to an area watch application, and pushes the location to an element under the direction of the area watch application.

Definitions of the particular 'areas' being watched are important to the successful implementation of an area watcher. In the disclosed embodiments, geographical codes are used to define the various watched area(s), e.g., postal code, principality, state, and/or country. Alternatively, the watched areas may be defined by their relationship to elements of a particular telecommunication network, e.g., within a particular cell site area, within a particular location area (e.g., a group of cell site areas), within a mobile switching center (MSC) area (i.e., within a group of location areas), and within the Public Land Mobile Network (i.e., within a group of MSC Areas).

An updating service may optionally be implemented wherein the watched area(s) for a particular mobile device may be modified.

The area watcher feature may be preconfigured and left ongoing, or may be a polled type request by a third party requesting confirmation of the presence of a particular wireless user in a particular geographic area.

Area watcher services have many uses. For instance, using an area watcher service that notifies a third party when a wireless user enters an area surrounding their retail store. The retailer might then provide a timely short message to the wireless user relating to sales or promotions occurring at the retail store when they are proximate to it. As another example, a video rental store might send a "reminder" message "Your rentals are overdue", on their wireless device as they walk by the store. Services might remind customers of appointments, or even send directions to a particular floor or office in a building when the client comes close to the building. The services might even be just geographic in nature, e.g., special events being held nearby. The possibilities are endless.

The area watch service may allow soliciting by third parties, or it may allow soliciting only once permitted by the wireless user (e.g., to let them know of promotions at a particular store or mall whenever they become proximate to it).

FIG. 1 shows a wireless area watcher application 100 for a wireless network application resident in a service control point (SCP) 170 of a carrier's wireless intelligent network 119, in accordance with the principles of the present invention. While shown resident in an SCP 170, an area watcher application 100 may be resident in any one (or more) suitable element(s) of a wireless carrier's network, in accordance with the principles of the present invention.

As shown in FIG. 1, an SCP 170 of a carrier's wireless intelligent network 119 is adapted to include a wireless area watcher application 100. The wireless area watcher 100 communicates with a location management system 160, a location determiner 130, and a speed determiner 140, all in the wireless carrier's network. The wireless network 119 of the disclosed embodiment further includes a Short Message Service Center (SMSC) 150, Message Servicing Center (MSC) with Visitors Location Register (VLR) 190 and Home Location Register (HLR) 180. The wireless area watcher 100 in accordance with the principles of the present invention utilizes location information determined by a location determiner 130 to determine a proximate location of a wireless user, and then uses that location information to determine if the wireless user is within an area being watched.

Figure 2:
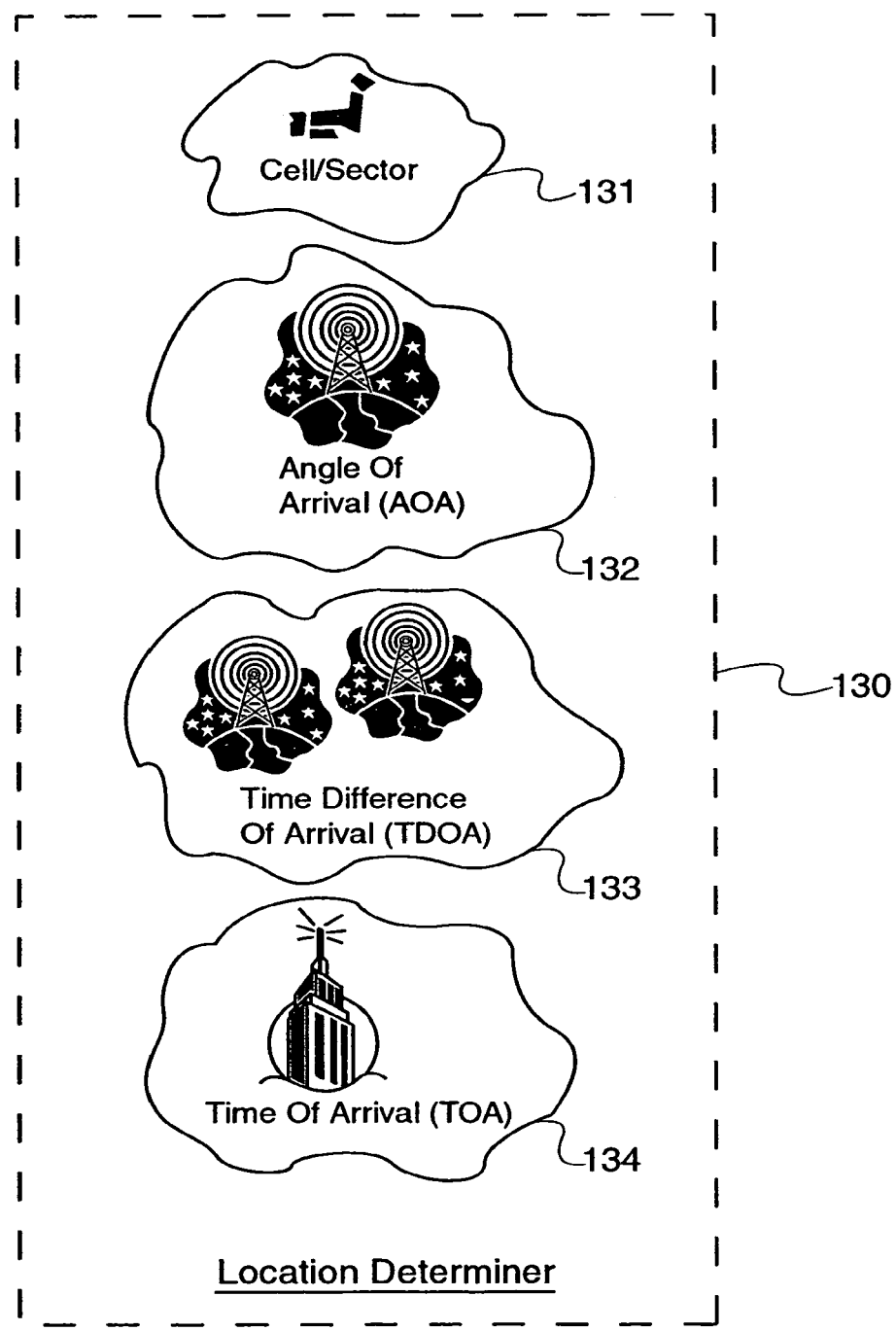
FIG. 2 depicts various embodiments of a location determiner shown in FIG. 1.

FIG. 2 depicts various examples of location determiners 130 shown in FIG. 1 that may be utilized by the present invention.

In particular, as shown in FIG. 2, the location determiner 130 and location management system 160 perform the location management functions of determining subscriber location. Exemplary techniques implemented in the location determiner 130 are call/sector ID 131, angle of arrival (AOA) 132, time difference of arrival (TDOA) 130, time of arrival (TOA) 134, all of which are otherwise known in the art. The present invention is entirely separate from the particular type of location detection used. Any suitable type of location determination may be used in conjunction with an area watcher.

Returning to FIG. 1, location information is determined by the location determiner 130 at the wireless network, though location may alternatively be determined in the wireless device itself (e.g., using a Global Positioning Satellite (GPS) system) and provided to the wireless area watcher 100, which in turn compares the wireless user ID and location information to entries in a watched area database 105.

Speed information may optionally be determined by the location management system of the wireless network 119, to augment the area watcher services. For instance, the slower the speed of the wireless user (e.g., indicating a pedestrian rather than a motorist), perhaps the more likely they are to be affected by information about a promotion occurring therein.

The speed determiner 140 may determine speed of a wireless device (e.g., walking tour, driving tour, flying tour, etc.) inferentially. The speed may be used, e.g., to determine relevance of the proximity of the wireless subscriber. For instance, if a wireless subscriber is passing by a retail store while driving at full speed on an Interstate highway, a message related to the retail store may be more nuisance than benefit.

A location and time history may be maintained by the location management system 160 with respect to particular subscribers being watched by the wireless area watcher 100.

A generalized determination of speed may be sufficient for many applications, e.g., whether the wireless device acts as if it is consistent with a walking subscriber, driving subscriber, biking subscriber, flying subscriber, etc. The wireless subscriber being watched by the wireless area watcher 100 may alternatively be prompted by the wireless area watcher 100 and/or location management system 160 to manually (or audibly) input a particular mode of transportation, generally indicate whether their speed is less than or greater than a given speed, e.g., less than 5 miles/hour (e.g., walking) or more than 5 miles/hour (e.g., biking, driving, etc.) Of course, the wireless subscriber may also be prompted for location information, which may be input manually, though the present invention is focused more on the advantages that an automated implementation of the area watcher provides.

Voice recognition may be implemented in the carrier's wireless network 119 (e.g., accessible to the SCP 170) to simplify a user's input of relevant information, e.g., in navigating through an appropriate user interface menu. For instance, a user can speak the name or other identifying feature of areas that they would like to be "watched" in.

Figure 3:
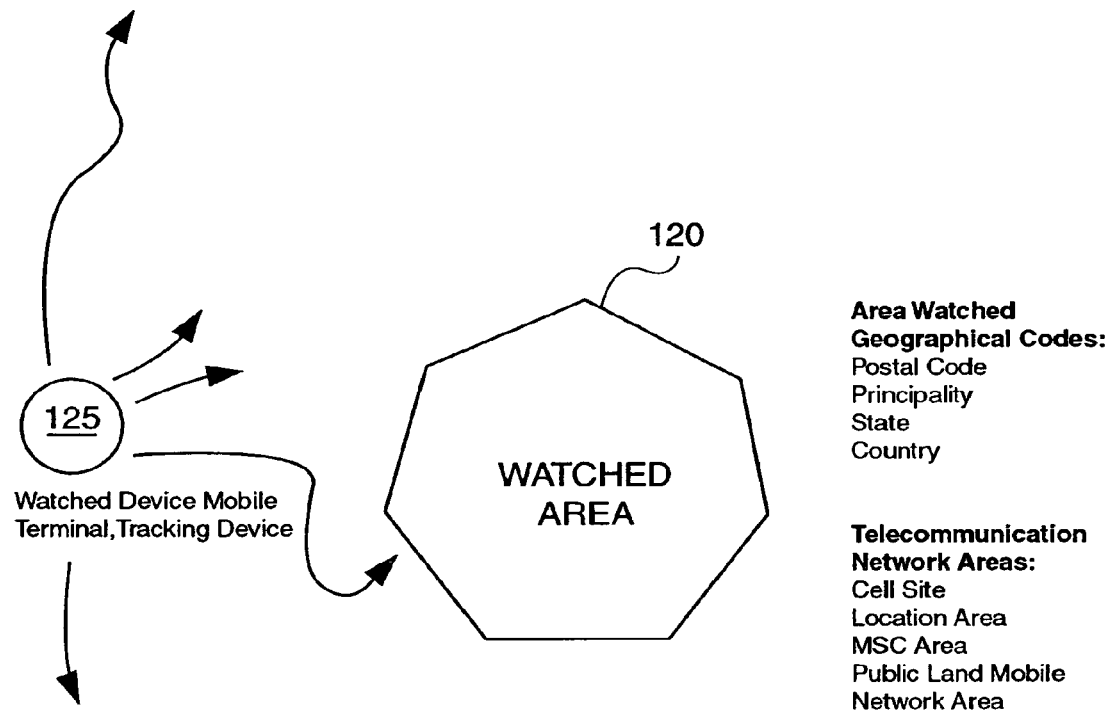
FIG. 3 depicts an established Area Watch and a relevant watched UE/MS device, in accordance with the principles of the present invention.

FIG. 3 depicts an established area watch feature for at least one particular watched UE/MS device, in accordance with the principles of the present invention.

As shown in FIG. 3, a watched area 120 is defined in any suitable and appropriate manner, e.g., by geographical related boundaries, or by telecommunication network defined boundaries. Exemplary geographical related boundaries include, e.g., by street, by postal code, by principality, and even by state or country. Exemplary telecommunication network defined boundaries include, e.g., by cell site, by location area, by mobile switching center (MSC) area, or by public land mobile network area.

The watched area 120 monitors if/when a watched device 125 enters the boundaries of the watched area 120. While the boundaries are ideally accurately defined, specific perimeters may be fuzzy due to the nature of radio communications. Nevertheless, the boundaries will be as accurate as the specific location technology being used. For instance, if the watched device includes a Global Positioning Satellite (GPS) system for location information, the boundaries of the watched area will be extremely accurate. On the other hand, if radio communication type location technology such as angle of arrival and/cell sector is used the exact location of the boundaries of the watched area 120 may be somewhat fuzzier.

Figure 4:
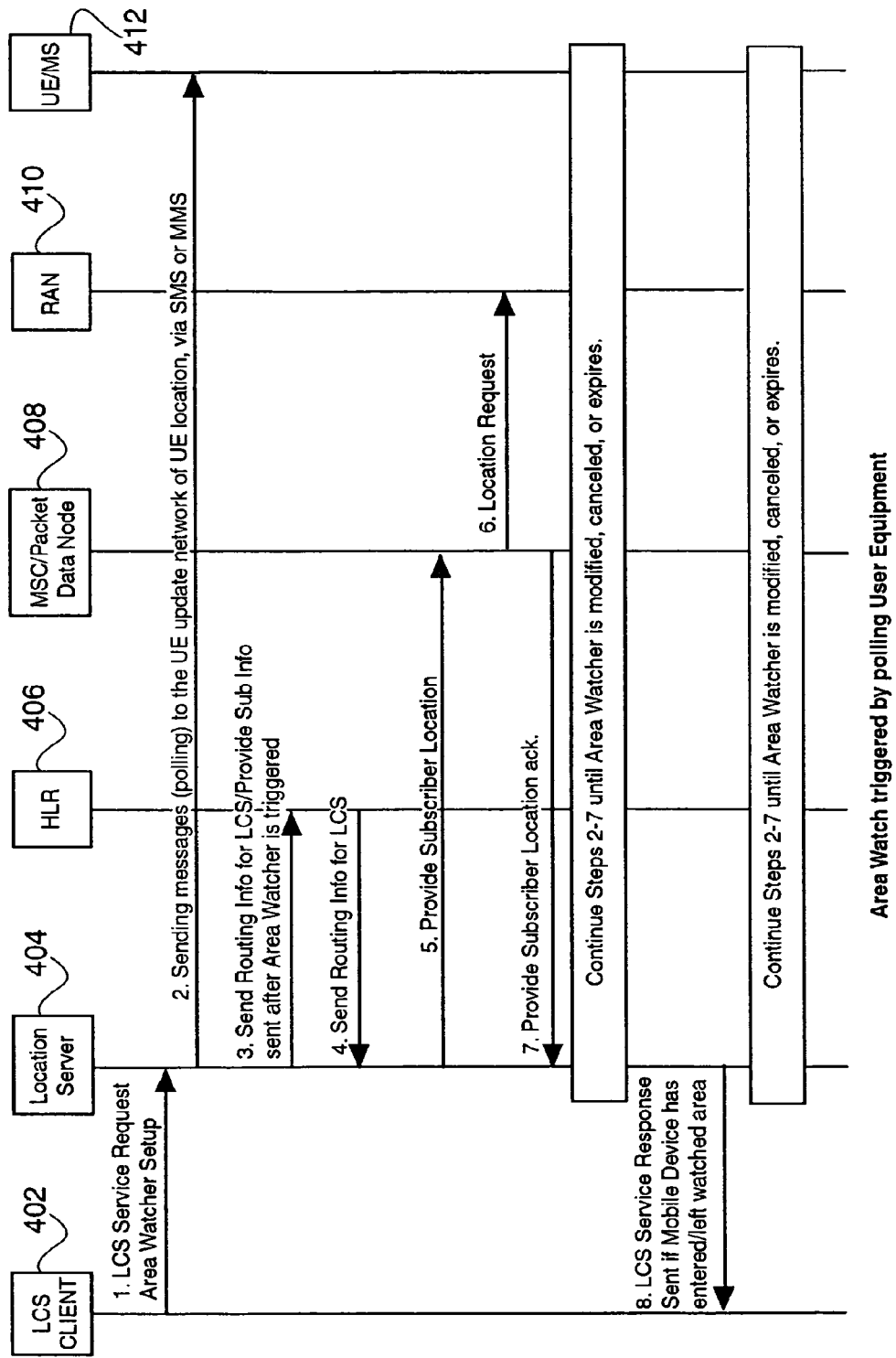
FIG. 4 shows an Area Watch event triggered by polling user equipment, in accordance with one aspect of the present invention.

FIG. 4 shows an Area Watch event triggered by polling user equipment, in accordance with one aspect of the present invention. Elements involved in the events shown in FIG. 4 include a location services client (LCS) client 402, a location server (LS) 404, a home location register (HLR) 406, an MSC/packet data node 408, a radio access network (RAN) 410, and user equipment or mobile subscriber (UE/MS) 412.

The disclosed network elements 402-412 are by way of example only. Of course, other elements in a wireless network may be implemented within the scope of the present invention.

As shown in step 1 of FIG. 4, a location services (LCS) client 402 sends a message and sets up an area to watch to a relevant location server 404.

In step 2, once the area watch feature is setup, messages are sent to the user equipment/mobile subscriber 412 to update the network with current and live location information regarding the mobile subscriber 412, e.g., by MSC location, cell site location, etc.

In step 3, once the location update is made, the location server 404 requests routing information, and location information such as MSC and perhaps cell site information, to the home location register (HLR) 406.

In step 4, the response to the request made in step 3 is sent.

In step 5, location is requested to either the MSC or packet data node 408 for precise location information, e.g., GPS location information, location information provided using triangulation methods, etc.

In step 6, the location request is forwarded to the radio access network (RAN) 410 if needed.

In step 7, a response to the location request is sent to the location server 404.

Steps 2-7 are repeatedly performed in the exemplary embodiment, e.g., at a designated intervals, to monitor for specific mobile subscribers such that the relevant mobile subscriber 412 will be detected upon entering or leaving a particular watched area 120.

In step 8, if the location reported to the location server 404 determines that the mobile subscriber 412 has entered or left a watched area 120, a message is sent to the relevant LCS client 402 (e.g., the LCS client that originally established the area watch feature for that watched area 120, for that mobile subscriber 125, which that mobile subscriber 125 just entered).

Figure 5:
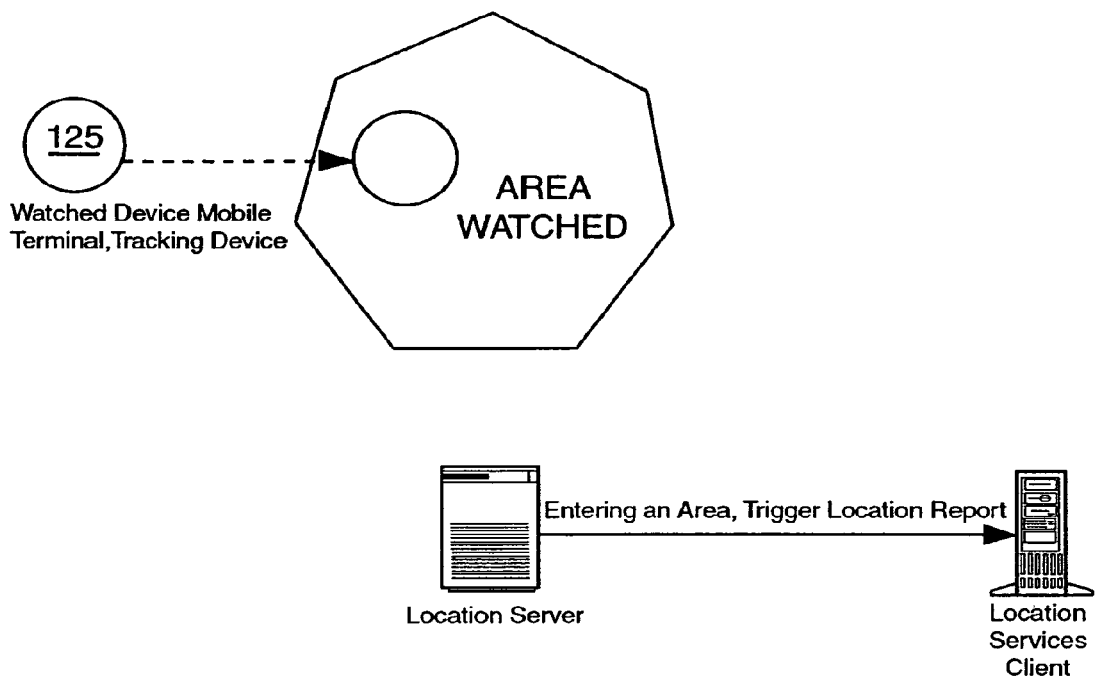
FIG. 5 shows when a watched UE enters a defined area, the location server of UE triggers a message to report the UE location to the Location, in accordance with the principles of the present invention.

FIG. 5 shows when a watched mobile subscriber 125 enters a particular defined watched area 120, the location server 404 of the mobile subscriber 125 triggers a message to report its location, in accordance with the principles of the present invention.

Figure 6:
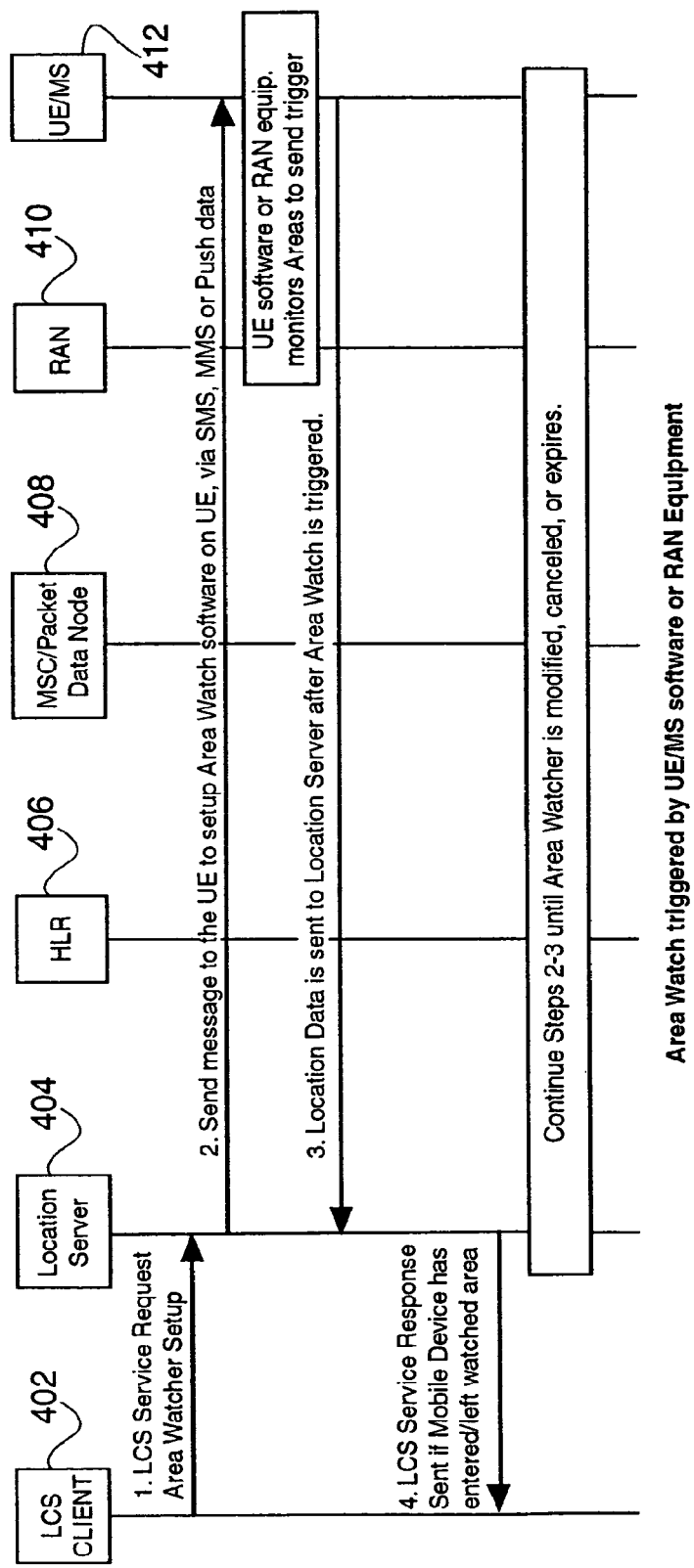
FIG. 6 shows an Area Watch event triggered by UE/MS software or RAN equipment, in accordance with another aspect of the present invention.

FIG. 6 shows a Area Watch triggered by mobile subscriber software or radio access network equipment, in accordance with the principles of the present invention.

In particular, as shown in step 1 of FIG. 6, a location services client 402 sends a message and sets up an area to watch to the location server 404.

In step 2, once the area watch feature is established and set up, messages are sent to the MSC/packet data node 408 or mobile subscriber 125 to establish a watch for that particular subscriber, in that particular watched area 120.

Software on the mobile subscriber 125 or MSC/packet data node 408 monitor the location of the mobile subscriber 125 until the software determines that the mobile subscriber 125 has entered or left the relevant watched area 120.

In step 3, if the area watcher module determines that any watched mobile subscriber 125 has entered or left this (or other) watched area 120, accurate location information regarding that mobile subscriber 125 is sent to the LCS client 402 that set up the area watch feature in the first place.

Then finally, in step 4, the location information regarding the watched mobile subscriber 125 is forwarded to the relevant LCS client 402 (e.g., the LCS client 402 that originally established the watch for that mobile subscriber 125 in that watched area 120).

Figure 7:
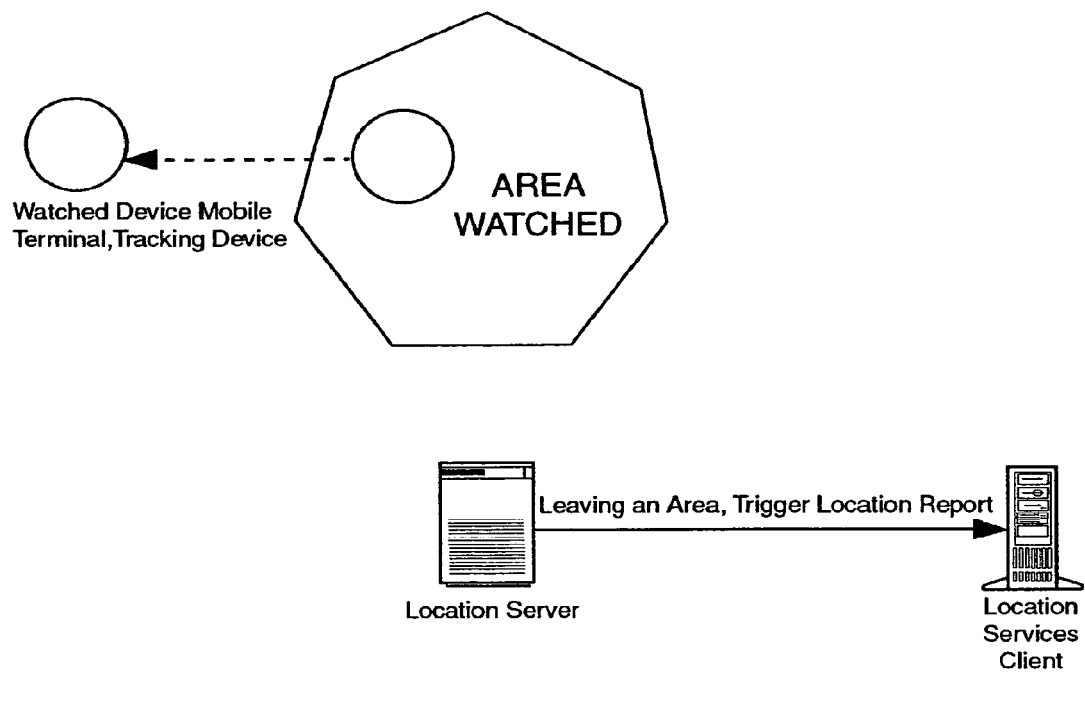
FIG. 7 shows when a watched UE leaves a defined area, the location server or UE triggers a message to report the UE location to the Location, in accordance with the principles of the present invention.

FIG. 7 shows that when a watched mobile subscriber 125 leaves a defined watched area, the location server 404 or mobile subscriber 125 triggers a message to report the location of that mobile subscriber 125 to the location server 404, in accordance with the principles of the present invention.

Thus, in accordance with the principles of the present invention, a watched device 125 may report location periodically, or in response to repeated or periodic triggers (e.g., polling). The location may be reported, triggering a watched area event, as a result of an action performed by the mobile subscriber wireless device 125, or by its entering or leaving a designated watched area 120.

An area watcher in accordance with the principles of the present invention has particular application for use with vendors of location services (e.g., with GMLS and MPC).

An area watcher in accordance with the principles of the present invention may be implemented with any desirable level of privacy protections, including levels that restrict transmission of location information for those particular subscribers that opt-out of the service, or who otherwise desire that their location information not be provided to third parties. For instance, existence in the watched area may be reported without disclosure of the exact location of the particular mobile subscriber 125.

In accordance with the present invention, information may or may not be provided with respect to when the wireless user 125 exits the area being watched 120, depending upon the particular needs of the wireless carrier. Elimination of "exit" messages would reduce network loading. Alternatively, polling or other occasional updates may be implemented to confirm the continued presence of the mobile subscriber 125 in a particular area 120 being watched. Upon the absence of a confirmation message when expected, the wireless user 125 can then be presumed by the requesting third party to have exited the watched area 120.

Moreover, to assure the privacy of wireless users, accurate location information may be blocked from transmission to the requesting third party. If such a feature is desired, only the affirmative "present" type information, or "not present" information may be provided to the requesting third party. This would indicate merely that the mobile subscriber 125 is somewhere in the watched area 120, but does not want to provide the third party with exact location information.

While the invention has been described with reference to the exemplary embodiments thereof, those skilled in the art will be able to make various modifications to the described embodiments of the invention without departing from the true spirit and scope of the invention.

What is claimed:

1. A wireless device executing an area watcher, the area watcher being configure to:
   receive a request to watch a location of the wireless device relative to a geographic area defined by a boundary;
   detect a privacy protection associated with the wireless device, wherein the privacy protection blocks location information characterizing an exact location of the wireless device from transmission to a third party;
   provide, in response to detecting the privacy protection, an indication of a presence of the wireless device within the geographic area to a network node of the third party, wherein the indication conforms to rules set in the privacy protection and includes data characterizing a type of travel employed by the wireless device that is based on a speed of the wireless device; and
   receive a message from the third party in response to providing the indication.

2. The wireless device of claim 1, wherein the geographic area is defined by a zip code.

3. The wireless device of claim 1, wherein the geographic area is defined by boundaries of the reach of a particular cell site.

4. The wireless device of claim 1, wherein the geographic area is defined by proximity to a particular retail establishment.

5. The wireless device of claim 1, wherein the area watcher is further configured to provide a request to associate the wireless device with the geographic area.

6. The wireless device of claim 1, wherein the message characterizes a retail offer.

7. The wireless device of claim 1, wherein the message from the third party is selected based on data characterizing the type of travel employed by the wireless device.

8. A method comprising:
receiving a boundary of a geographic area to be watched;
detecting, at a wireless device, at least one of entry and exit of the geographic area;
determining, at an area watcher of the wireless device, a type of travel employed by the wireless device based on a speed of the wireless device;
identifying, by the area watcher of the wireless device, a privacy protection associated with the wireless device, wherein the privacy protection blocks location information characterizing an exact location of the wireless device from transmission to a third party;
providing, from the wireless device in response to the identifying, an indication of a presence of the wireless device within the geographic area to a network node of the third party, wherein the indication conforms to rules set in the privacy protection and includes data characterizing a type of travel employed by the wireless device; and
receiving a message from the third part in response to the network node receiving the indication.

9. The method of claim 8, wherein the message relates to unsolicited retail information.

10. The method of claim 8, wherein the detecting is based on a position for the wireless device received from a global positioning system.

11. The method of claim 8, further comprising blocking, at the wireless device, a transmission of the location information.

12. The method of claim 8, wherein the message from the third party is selected based on data characterizing the type of travel employed by the wireless device.

13. A non-transitory machine readable medium having machine readable instructions, the machine readable instructions being configured to:
monitor a location of a wireless device relative to a geographic area;
determine a speed of the wireless device;
determine a type of travel of the wireless device based on the speed of the wireless device;
determine that the wireless device has at least one of entered and exited the geographic area;
detect execution of a level of privacy protection that is configured to prevent information characterizing an exact location for the wireless device from being transmitted to a third party;
transmit an indication of a presence of the wireless device being within the geographic area to a network node of the third party in response to the determining and the detecting, wherein the indication conforms to rules set in the privacy protection, wherein the indication of the presence identifies a type of travel employed by the wireless device; and
receive a message from the third party in response to transmitting the indication.

14. The medium of claim 13, wherein machine readable instructions are further configured to provide a request to associate the wireless device with the geographic area.

15. The medium of claim 13, wherein the machine readable instructions are further configured to receive a boundary for the geographic area.

16. The medium of claim 13, wherein the monitoring comprises receiving a poll request for location information for the wireless device.

17. The medium of claim 13, wherein the geographic area is defined by a zip code.

18. The medium of claim 13, wherein the geographic area is defined by proximity to a particular retail establishment.

19. The medium of claim 13, wherein the machine readable instructions are further configured to send a request to a global positioning system for the location information for the wireless device.

20. The medium of claim 13, wherein the message is selected based on data characterizing the type of travel employed by the wireless device.

* * * * *

UNITED STATES PATENT AND TRADEMARK OFFICE
CERTIFICATE OF CORRECTION

PATENT NO.        : 9,602,968 B2                              Page 1 of 1
APPLICATION NO.   : 14/470409
DATED             : March 21, 2017
INVENTOR(S)       : Gordon Hines et al.

It is certified that error appears in the above-identified patent and that said Letters Patent is hereby corrected as shown below:

In the Claims

Column 7, Line 28 Claim 8, reads "third part" should read --third party--

Signed and Sealed this
Thirtieth Day of May, 2017

Michelle K. Lee
*Director of the United States Patent and Trademark Office*